United States Patent

[11] 3,601,128

| [72] | Inventor | Salomon Hakim<br>Carrera 13, No. 48–26, Bogota, Colombia,<br>South Africa |
|---|---|---|
| [21] | Appl. No. | 786,928 |
| [22] | Filed | Dec. 26, 1968 |
| [45] | Patented | Aug. 24, 1971 |

[54] VENTRICULOATRIAL SHUNT ACCUMULATOR
3 Claims, 8 Drawing Figs.

[52] U.S. Cl. .................................................. 128/350,
138/30
[51] Int. Cl. ....................................................A61m 27/00,
F16l 55/04
[50] Field of Search........................................... 128/350,
350 V, 2; 138/26, 30

[56] References Cited
UNITED STATES PATENTS

| 3,288,142 | 11/1966 | Hakim........................ | 128/350 |
| 2,544,289 | 3/1951 | Andrews..................... | 138/30 X |
| 2,840,111 | 6/1958 | Kerr............................ | 138/26 |
| 3,111,125 | 11/1963 | Schulte....................... | 128/350 V |
| 3,353,560 | 11/1967 | McCulloch.................. | 138/30 |

*Primary Examiner*—Channing L. Pace
*Attorney*—Kenway, Jenney & Hildreth

ABSTRACT: In a ventriculoatrial shunt, a fractional backflow of cerebrospinal fluid into the ventricular cavity is provided by a resilient accumulator chamber which responds to the pressure fluctuations of the cerebrospinal fluid. This backflow is effective to discourage clogging of the ventricular catheter by the choroid plexus, or other matter.

PATENTED AUG 24 1971 3,601,128

INVENTOR.
SALOMON HAKIM
BY
Kenway, Jenney + Hildreth
ATTORNEYS

VENTRICULOATRIAL SHUNT ACCUMULATOR

It is frequently necessary in treating patients with hydrocephalus to provide a ventriculoatrial shunt to drain the cerebro spinal fluid into the venous blood system. A system of this type is described by Ojemann, Robert G. "Initial Experience With The Hakim Valve for Ventriculovenous Shunt" Journal of Neuro Surgery (1968) Vol. XXVIII, No. 3, pages 283–287.

In providing this shunt a catheter is inserted into the ventricular cavity and is connected to a tube system including two stainless steel ball check valves in series (see Hakim U.S. Pat. No. 3,288,142) leading to a cardiac catheter which leads into the jugular vein. A common difficulty encountered with the system of this type is clogging of the ventricular catheter by solid matter which can be present in the cerebrospinal fluid, and is drawn by the drainage flow toward and into the openings into the catheter. Particularly troublesome is the choroid plexus, a membraneous network that grows in a ventricular cavity and follows the flow of drainage fluid toward the catheter, much as grass or weed growing in a stream tends to follow the flow of the water.

The present invention is aimed at reducing or preventing the tendency of the choroid plexus, and other solid matter within the ventricular cavity, from clogging the openings of the cerebral ventricular catheter, and is based upon the discovery that if a fraction of the cerebrospinal fluid draining from the ventricle is caused to back flow periodically through the ventricular catheter, clogging of this catheter by the choroid plexus can be largely eliminated.

The invention resides in incorporating in the drainage system, upstream from the valve system a resilient accumulator chamber. This serves to accumulate a quantity of cerebrospinal fluid under pressure with each pulsation, when the pressure of drainage is relatively high, and cause a backflow of the accumulated flow against the downstream resistance of the check valves and tubing when the pressure of the draining fluid is relatively low. This backflow periodically into the ventricle disrupts the steady one-way flow drainage pattern and apparently diverts the choroid plexus sufficiently to reduce its tendency to clog the catheter. The accumulator consists of a chamber having a flexible wall which will expand against the resilience of a gas chamber.

Representative embodiments of the invention, and the system to which it relates are illustrated in the accompanying drawings in which.

Figure 1:
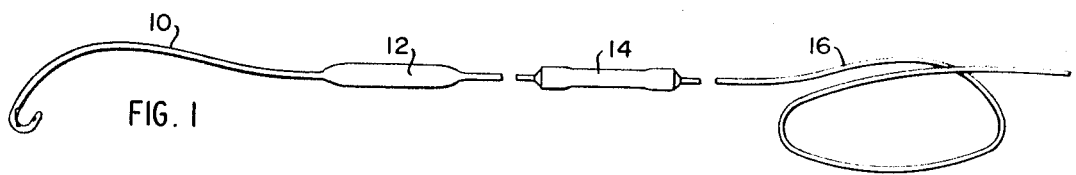
FIG. 1 illustrates the drainage system from the ventricular catheter through the accumulator and valves to the cardiac catheter.
Figure 2:
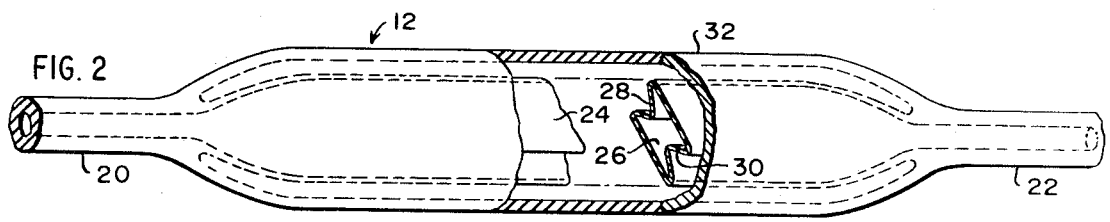
FIG. 2 is a view partly broken away to reveal structural details, of one form of accumulator.
Figure 3:
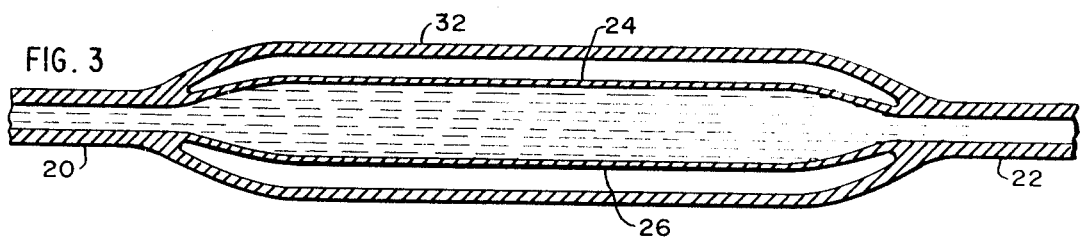
FIGS. 3, 4, 5 and 6 are longitudinal and transverse cross sections of the device illustrated in FIG. 2.

The ventriculoatrial shunt illustrated in FIG. 1 consists of a ventricular catheter 10, (described in detail in copending application, Ser. No. 521,209 filed Jan. 17, 1966.) The accumulator 12 connected to the outlet end of the catheter 10, the double-check valve system 14 (described in applicant's U.S. Pat. No. 3,288,142) which connects into the cardiac catheter 16. Installed in a patient the ventricular catheter 10 is inserted into the ventricle of the brain. The accumulator 12 and check valve system 14 are placed beneath the scalp and the cardiac catheter 16 is inserted into the jugular vein and positioned in an appropriate location for drainage into the right atrium.

The accumulator 12 of the embodiment illustrated in FIGS. 2 through 6 consists of inlet and outlet tube portions 20 and 22 respectively which lead into an elongated accordion chamber having upper and lower wall portions 24 and 26 respectively and infolded sidewalls 28 and 30. The accordion chamber is surrounded by a tubular air chamber contained within a more or less rigid tube 32 which tapers inwardly at its ends and connects to the outer walls of the inlet and outlet tubes 20 and 22.

The space between the outer wall 32 and the accordion chamber within it is filled with air, or other gas which serves to provide resilient pressure against the expansion of the accordion chamber.

The accumulator of this embodiment may be composed of silicone rubber or other similar plastics, with the wall portion of the accordion chamber being thinner and more flexible than the walls of the surrounding tube 32.

During an increase in the pressure of the cerebrospinal fluid in the ventricle, in response to a heart beat, fluid will begin to flow through the system shown in FIG. 1. Due to the resistance to flow of the tubing 16, and the valve 14 (if used) an increase in pressure is experienced at the location of the accumulator 12.

Figure 4:
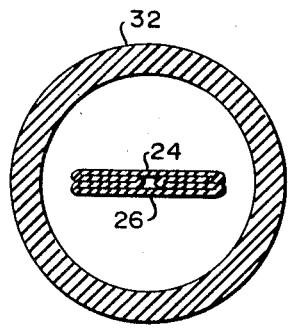
Figure 5:
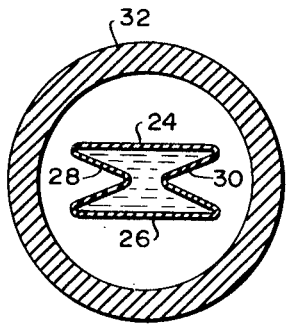
Figure 6:
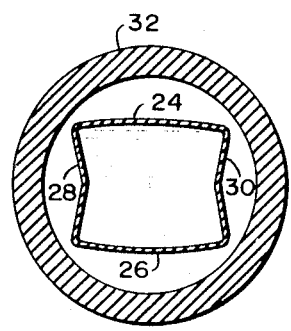

Thus, when arranged as illustrated in FIG. 1 the accordion chamber is caused to expand as pressure builds up, as suggested in FIGS. 4, 5 and 6 thereby accumulating within it a quantity of cerebrospinal fluid. At the same time the air surrounding the chamber is compressed to equalize the pressure of the fluid. When the pressure within the ventricle drops and the check valves in the valve system 14 close, the cerebrospinal fluid within the accordion chamber, under the pressure of the surrounding air, is forced backwards through the catheter 10 into the ventricle. Normally the cerebrospinal fluid is under a pulsating pressure resulting from the patient's heart action, and a fractional backflow of cerebrospinal fluid will occur at the frequency of the patient's hear beat.

In actual practice it has been found that the volume within the accordion chamber need be only about 1 to 2 cubic centimeters, and that within the surrounding air chamber about the same to establish a satisfactory backflow from the accumulator.

Figure 7:
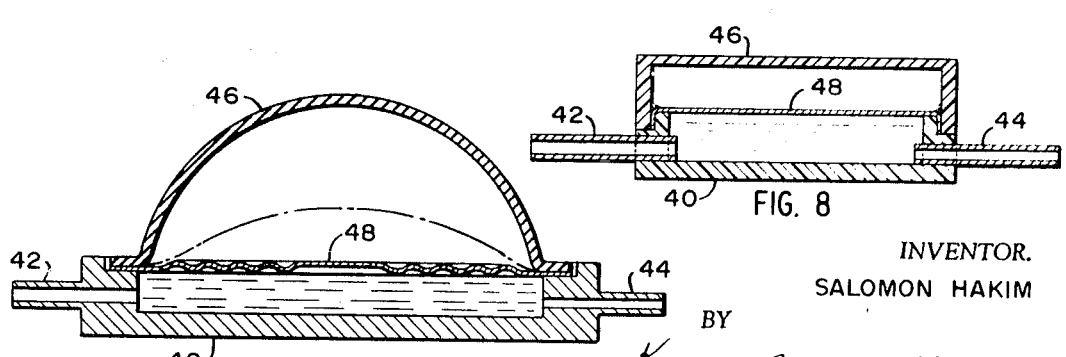
FIGS. 7 and 8 are alternative embodiments of an accumulator, each being shown in elevational cross section, the plan being generally circular.
Figure 8:
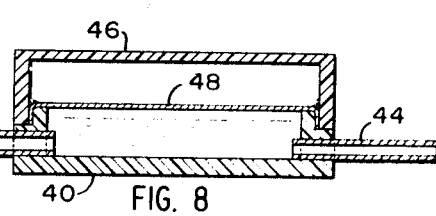

In the embodiments illustrated in FIGS. 7 and 8 the accumulator is formed of rigid plastic members including a pan 40 having inlet and outlet conduits 42 and 44 for the fluid, a cover 46 mounted over the pan, and a flexible membrane 48 covering the pan and forming an air chamber within the cover. Preferably, the outlet conduit 44 is of lesser diameter than the inlet 42 to assist in maintaining higher flow resistance at the outlet end to facilitate the establishment of backwash flow, particularly if a valve unit such as at 14 is not employed or if the valves are biased to close at the low-pressure dwells of each pulse cycle. In embodiments constructed as illustrated in FIGS. 7 and 8 the pan 40 and cover 46 may be formed of a plastic such as polystyrene or hard silicone rubber, and the membrane 48 separating them may be of a thin corrugated metal, e.g., stainless steel, diaphragm as suggested by FIG. 7 or a thin plastic, such as polyethylene, Teflon, Saran, as suggested by FIG. 8. The inlet and outlet conduits 42 and 44 may be integrally molded as suggested by FIG. 7 or provided by metal inserts as suggested by FIG. 8.

Although this invention has been described with reference to the presently preferred embodiments it is contemplated that modifications will occur to those skilled in the art and familiar with the principles herein set forth and that such may be made without departing from the scope of this invention.

Having thus disclosed my invention and described in detail presently preferred embodiments thereof, I claim and desire to secure by Letters Patent:

1. In a ventriculoatrial shunt system which includes a ventricular catheter and an implantable tube system for draining cerebrospinal fluid into the patient's vein, an accumulator having an inlet conduit connected to said catheter and an outlet conduit connected to said tube system, a chamber communicating with said inlet and outlet conduits and having a flexible outwardly movable wall portion, wall means forming with said wall portion an enclosure, and gas within said enclosure providing resilient support to said wall portion such that variations in the pressure of the cerebrospinal fluid in said chamber cause pulsation of said wall portion thereby causing periodic fractional backflow of cerebrospinal fluid into and through the said catheter.

2. The accumulator defined by either of claim 1 wherein the outlet conduit is of lesser cross section than the inlet conduit.

3. The ventriculoatrial shunt system defined by claim 1 wherein the outlet conduit leads to a check valve.